United States Patent
Chen et al.

(10) Patent No.: US 9,663,013 B2
(45) Date of Patent: May 30, 2017

(54) TRAILER AND FRAME THEREOF

(71) Applicants: Shenzhen CIMC Vehicle Co., Ltd., Shenzhen (CN); CIMC Vehicles Group Co., Ltd., Shenzhen (CN); China International Marine Containers (Group) Ltd., Shenzhen (CN)

(72) Inventors: Peng Chen, Shenzhen (CN); Nan Li, Shenzhen (CN); Qingyuan Qin, Shenzhen (CN); Jianxing Wang, Shenzhen (CN); Zhuoan Wu, Shenzhen (CN); Xing Yan, Shenzhen (CN); Zhongcheng Gou, Shenzhen (CN); Zhu Chen, Shenzhen (CN); Ping Wang, Shenzhen (CN)

(73) Assignees: Shenzhen CIMC Vehicle Co., Ltd., Shenzhen (CN); CIMC Vehicles Group Co., Ltd., Shenzhen (CN); China International Marine Containers (Group) Ltd., Shenzhen (CN)

( * ) Notice: Subject to any disclaimer, the term of this patent is extended or adjusted under 35 U.S.C. 154(b) by 0 days.

(21) Appl. No.: 14/984,313

(22) Filed: Dec. 30, 2015

(65) Prior Publication Data

US 2016/0185269 A1 Jun. 30, 2016

(30) Foreign Application Priority Data

Dec. 31, 2014 (CN) .......................... 2014 2 0871730

(51) Int. Cl.
*B60P 1/16* (2006.01)
*B60P 3/22* (2006.01)

(52) U.S. Cl.
CPC ............... *B60P 1/16* (2013.01); *B60P 3/2245* (2013.01)

(58) Field of Classification Search
CPC .................................. B60P 1/16; B60P 3/2245
USPC ........ 298/1 A, 17 R, 19 B, 22 R, 19 V, 22 F, 298/21 V, 19 R; 254/93 R, 93 HP
See application file for complete search history.

(56) References Cited

U.S. PATENT DOCUMENTS

| | | | | |
|---|---|---|---|---|
| 1,745,959 A | * | 2/1930 | Steiner ...................... | B66F 3/35 254/93 HP |
| 4,572,579 A | * | 2/1986 | Saito ........................ | B60P 1/16 298/22 R |
| 7,975,986 B2 | * | 7/2011 | Bhachu ..................... | B66F 3/35 254/93 HP |

* cited by examiner

*Primary Examiner* — Stephen Gordon
(74) *Attorney, Agent, or Firm* — Fox Rothschild LLP (57) ABSTRACT

This disclosure relates to a frame and a frame thereof. The frame comprises a frame body, wherein the frame further comprises an assistant unloading device disposed on the frame body, the assistant unloading device comprises an air bag, a mounting plate, and at least a set of guides; the air bag is fixed to the mounting plate, the guides comprises a guiding tube and a guiding rod, the guiding tube is vertically disposed on the frame body, the guiding rod is inserted into the guiding tube and connected to the mounting plate, and by inflating the air bag, the guiding rod is moved to vertically rise along the guiding tube to perform assistant unloading, thereby the trailer and frame of the disclosure have not only a simple structure, a light mass, and a lower cost, but also an excellent lifting capability and a stable lifting process.

17 Claims, 6 Drawing Sheets

TRAILER AND FRAME THEREOF

CROSS REFERENCE

This application is based upon and claims priority to Chinese Patent Application No. 201420871730.4, filed on Dec. 31, 2014, the entire contents thereof are incorporated herein by reference.

TECHNICAL FIELD

The disclosure relates to tank container transport vehicles, and more particularly to a trailer and a frame thereof.

BACKGROUND

In a process of unloading a tank container, when there is relatively few liquid remained in the container, unloading speed would be reduced, and unloading may not be completely carried out, moreover, the tank container mainly serves to transport hazardous chemicals, so that during unloading, a completely unloading must be guaranteed. Therefore, there is requirement to provide a lifting device at a frame longitudinal beam of a tank container transport vehicle (e.g., a trailer), in order to lift the front of the tank container to a determined height, thus increasing the unloading speed and assuring the unloading completely carried out.

At present, in domestic liquid tank transportation, it has been suggested to use a hydraulic oil cylinder as an assistant unloading device for a dump container semi-trailer. However, though the structure of such assistant unloading device has a strong lifting capability and a high lifting height, and is suitable for unloading viscous materials such as asphalt, it is too unwieldy, and puts forwarding relatively higher requirements for structural strength in installation.

SUMMARY

The disclosure provides a trailer and frame thereof for solving the problems in the related art that the assistant unloading device on the trailer has too unwieldy structure, and requires a relatively high structural strength for installation.

In order to solve these technical problems, the disclosure provides a frame comprising a frame body and an assistant unloading device disposed on the frame body, wherein the assistant unloading device comprises an air bag, a mounting plate, and at least a set of guides. The air bag is fixed to the mounting plate. The guide comprises a guiding tube and a guiding rod, the guiding tube being vertically disposed on the frame body, and the guiding rod being inserted into the guiding tube and connected to the mounting plate. By inflating the air bag, the guiding rod is move to vertically rise along the guiding tube, thereby performing assistant unloading.

Further, the assistant unloading device further comprises at least one stopper, wherein the stopper is mounted at a bottom portion of the guiding rod, and a maximum width of the stopper is greater than an outer diameter of the guiding tube, so as to limit a maximum lifting height of the air bag.

Further, the stopper comprises a stop plate and a stop plate mounting base, wherein the stop plate mounting base is fixed in a bottom portion of the guiding rod, and has a center connected to a nut, and the stop plate is connected to the stop plate mounting base by a bolt mating with the nut.

Further, the stopper comprises a bolt and a nut, a threaded rod of the bolt laterally penetrating the bottom portion of the guiding rod, and a penetrating end of the threaded rod mating with the nut.

Further, the frame body comprises two frame longitudinal beams longitudinally disposed and a front bolster laterally disposed at front ends of the frame longitudinal beams, and the front bolster has a top surface depressed downward to form an air bag mounting base for placing the air bag therein.

Further, the air bag has a bottom portion connected to the air bag mounting base via bolts, and a top portion connected to a bottom surface of the mounting plate via bolts.

Further, the front bolster comprises a front bolster web that is disposed vertically and a front bolster top flange fixed on the top surface of the front bolster web, and an intermediate portion of the front bolster top flange is depressed to form the air bag mounting base.

Further, each of the frame longitudinal beams comprises a longitudinal beam top flange, a longitudinal beam bottom flange, and a longitudinal beam web vertically connected between the longitudinal beam upper and bottom flanges. The longitudinal beam top flange is connected to a bottom surface of the front bolster top flange. The longitudinal beam web is vertically connected to the front bolster web. The front bolster top flange is depressed at a position between the two frame longitudinal beams, portions of the front bolster top flange outside of the two frame longitudinal beams are bent to form a U-steel structure.

Further, the guiding tube is fixed on a bottom surface of the front bolster top flange. A through hole for allowing the guiding rod to insert into the guiding tube is disposed in a position of the front bolster top flange corresponding to the guiding tube. And a first reinforcing plate is disposed at a periphery of the top surface of the front bolster top flange corresponding to the through hole.

Further, the front bolster web comprises an intermediate web and two lateral webs. The intermediate web is positioned between the two frame longitudinal beams and vertically connected to the two frame longitudinal beams. The two lateral webs are respectively connected to outer sides of the two frame longitudinal beams.

Further, the intermediate web and the two lateral webs are provided with at least one weight-reducing hole, respectively.

Further, a partition panel is disposed on the intermediate web. The partition panel divides the intermediate web into an upper intermediate web and a lower intermediate web positioned beneath the upper intermediate web. At least one stiffener is vertically disposed between the partition panel and the front bolster top flange to support the air bag.

Further, lower sides of the lateral webs of the front bolster are inclined in respect to the front bolster top flange, such that the lateral webs of the front bolster form a structure wide in top and narrow in bottom. A lower side of the lateral web of the front bolster is connected to a side supporting plate. The side supporting plate has a lower end connected to the frame longitudinal beam, and a top end connected to a second reinforcing plate. The second reinforcing plate is further vertically connected to the lateral web of the front bolster.

Further, the front bolster further comprises a bottom plate connected to a bottom surface of the intermediate web, both ends of the bottom plate being respectively connected to the two frame longitudinal beams.

Further, the guiding rod is provided in a pair and is disposed at diagonal positions of the mounting plate.

Further, the air bag is a single air bag.

The disclosure further provides a trailer comprising the frame.

Compared with the related art, the trailer and frame of the disclosure have the following advantageous effects: according to the disclosure, an intermediate portion of a front bolster is designed to be depressed to from an air bag mounting base, on which the lifting air bag is mounted, so that a single air bag can perform lifting, thereby, the trailer and frame of the disclosure have not only a simple structure, a light mass, and a lower cost, but also an excellent lifting capability and a stable lifting process.

The reference signs in the drawings will be listed below:
100: trailer;
10: frame;
1: frame body;
11: frame longitudinal beam;
111: longitudinal beam top flange;
112: longitudinal beam bottom flange;
113: longitudinal beam web;
12: front bolster;
121: front bolster top flange;
1211: air bag mounting base;
1212: reinforcing plate;
122: front bolster web;
1221: intermediate web;
1221a: upper intermediate web;
1221b: lower intermediate web;
1221c: partition panel;
1221d: stiffener;
1221e: weight-reducing hole;
1222: lateral web;
1222a: weight-reducing hole;
1223: side supporting plate;
1224: reinforcing plate;
123: bottom plate;
124: corner lock;
2: assistant unloading device;
21: air bag;
211: air tube;
22: mounting plate;
23: guides;
231: guiding tube;
232: guiding rod;
24: stopper;
241: stop plate;
242: stop plate mounting base;
243: bolt;
244: nut;
245: bolt;
2451: threaded rod;
246: nut;
3: main unloading mechanism;
4: tank container;
5: air reservoir;
51: air tube;
6: manual control valve; and
61: exhaust port.

DETAILED DESCRIPTION

Hereinafter, the disclosure will be explained in detail with reference to the accompanying drawings.

Figure 1:
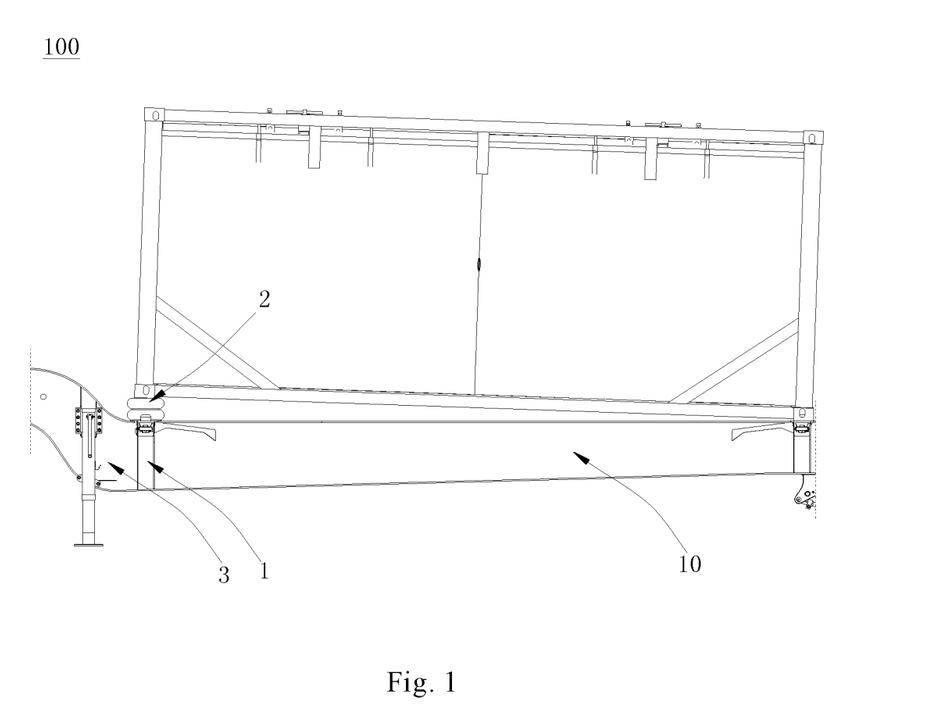
FIG. 1 is a schematic diagram of a trailer of the disclosure in unloading.

Referring to FIG. 1, the disclosure provides a trailer 100 comprising a frame 10. The frame 10 comprises a frame body 1, an assistant unloading device 2 disposed on the frame body 1, and a main unloading mechanism 3. A tank container 4 is carried on the frame body 1, of course, some other container may be carried on the frame body 1. If a full-laden tank container 4 is unloaded, the main unloading mechanism 3 firstly unloads the tank container 4. When a remained load in the tank container 4 is equal to 10%-30% of a full-laden load, the assistant unloading device 2 begins to lift the tank container 4 for performing an assistant unloading. As the load of the tank container 4 is decreasing, the assistant unloading device 2 would lift the tank container 4 to an increasing height, so as to speed up the unloading, and ensure the load in the tank container 4 to be unloaded completely.

Figure 2:
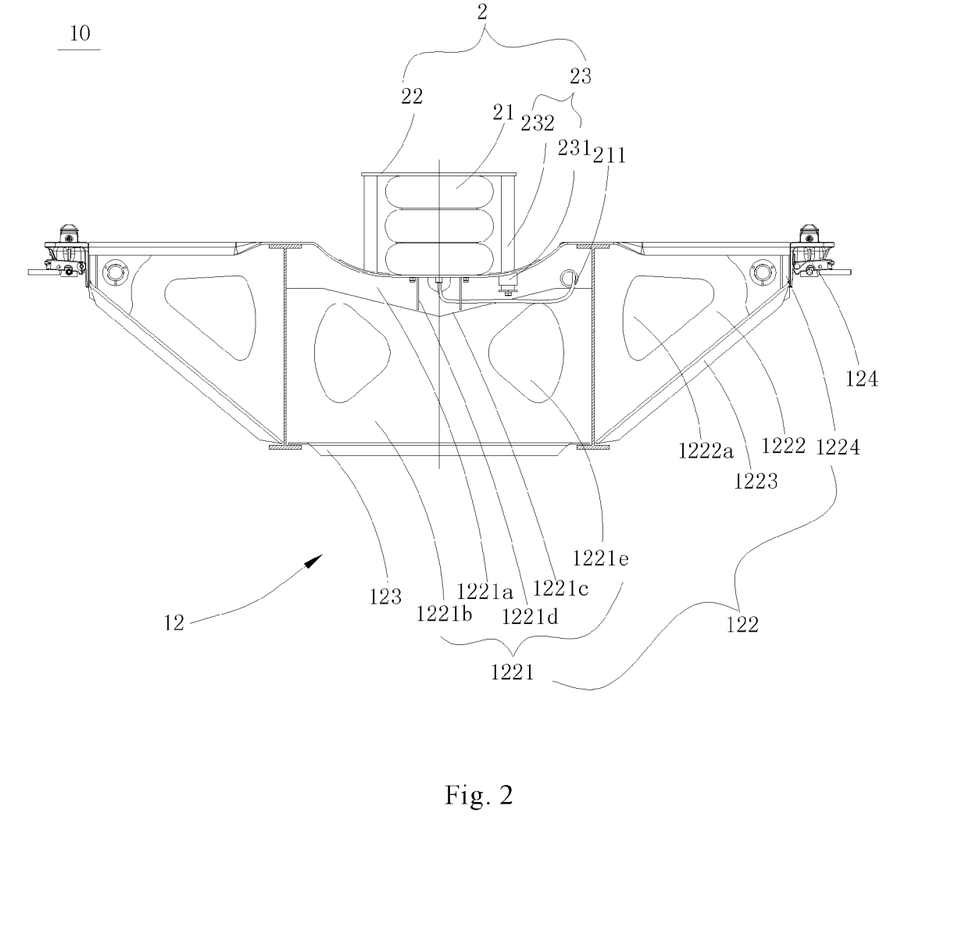
FIG. 2 is a front view of a frame of the disclosure after an air bag is inflated.
Figure 3:
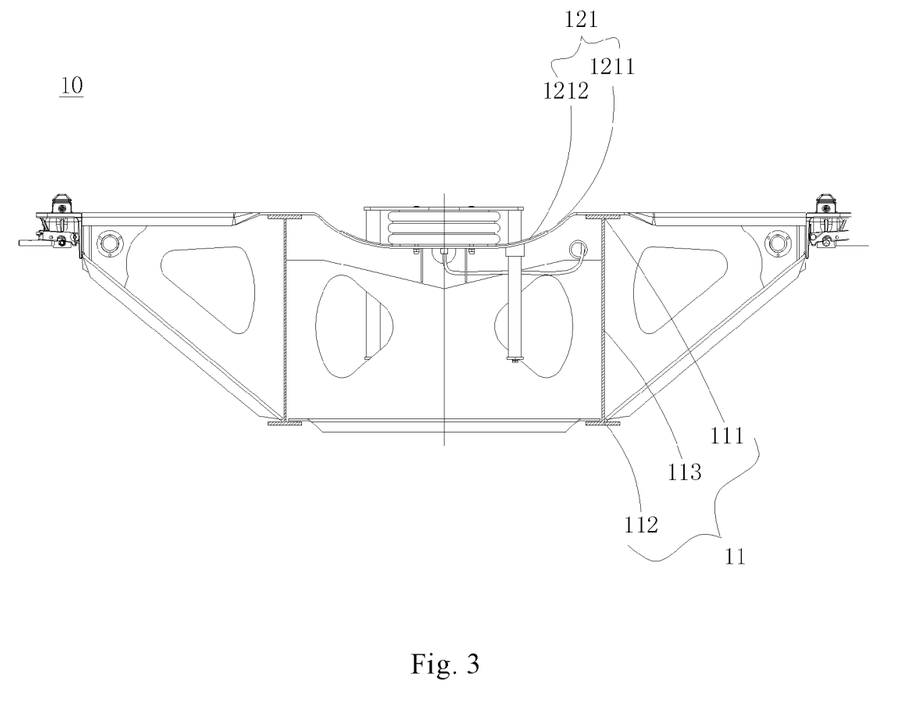
FIG. 3 is a front view of a frame of the disclosure after an air bag is deflated.
Figure 4:
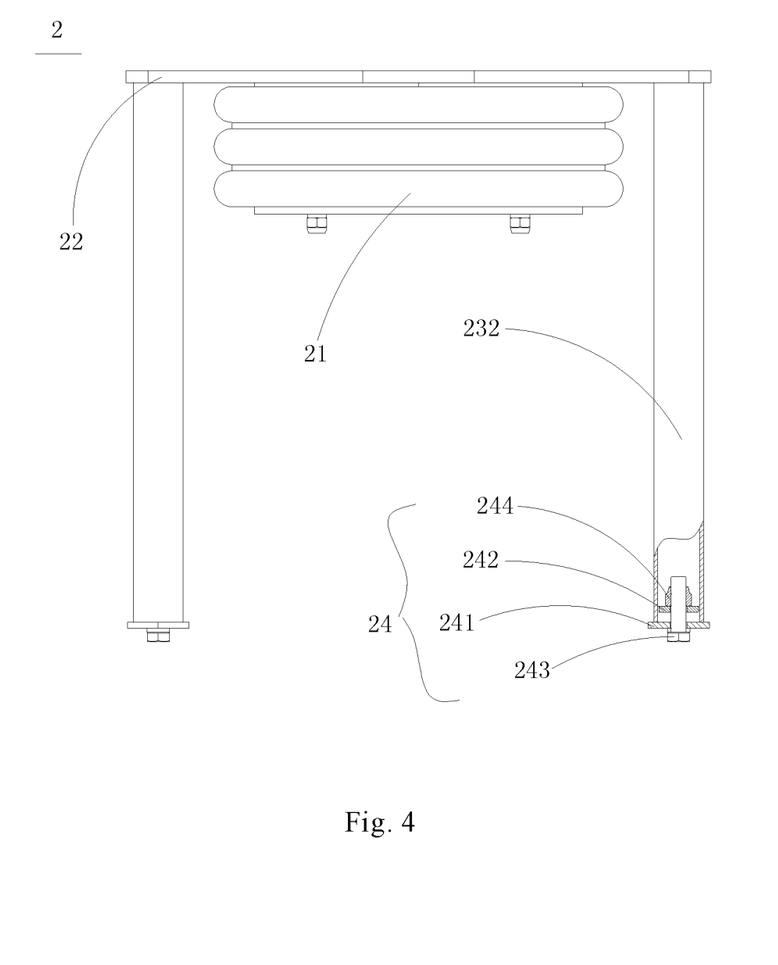
FIG. 4 is an enlarged schematic diagram of a stopper of an assistant unloading device according to one embodiment of the disclosure.

Referring to FIGS. 2 to 4, the assistant unloading device 2 comprises an air bag 21, a mounting plate 22, at least a set of guides 23, and at least one stopper 24.

In this the embodiment, the air bag 21 is a single air bag. The air bag 21 has a bottom portion connected to an intermediate position on the frame body 1 via bolts, and a top portion connected to a bottom surface of the mounting plate 22 via bolts. The bottom portion of the air bag 21 is further communicated with an air tube 211, so as to inflate the air bag 21 by the air tube 211. Of course, in other embodiments, the air bags 21 may be provided several and disposed at other positions on the frame body 1, respectively, for example, on both sides of the frame body 1.

The mounting plate 22 is positioned at a bottom portion of the tank container 4. By inflating the air bag 21, the mounting plate 22 can push and lift the tank container 4 for assistant unloading.

The guide 23 comprises a guiding tube 231 and a guiding rod 232 for performing a guiding function to the air bag 21 in the lifting process, so as to prevent a lateral displacement of the air bag 21. The guiding tube 231 is vertically disposed on the frame body 1. The guiding rod 232 is inserted into the guiding tube 231 and connected to the mounting plate 22. By inflating the air bag 21, the guiding rod 232 can vertically rise along the guiding tube 231 for performing assistant unloading. Preferably, the guiding rod 232 is provided with in a pair and respectively disposed at diagonal positions of the mounting plate 22, to prevent the air bag 21 from rollover in the lifting process.

The stopper 24 is mounted at the bottom portion of the guiding rod 232, and a maximum width of the stopper 24 is greater than an outer diameter of the guiding tube 231, so as to limit a maximum lifting height of the air bag 21, and prevent the safety risks caused by the lifting height of the tank container 4 becoming too high. Specifically, the stopper 24 comprises a stop plate 241 and a stop plate mounting base 242. The stop plate mounting base 242 is fixed in a bottom portion of the guiding rod 231, and has a center connected to the nut 244. the stop plate 241 is connected to the stop plate mounting base 242 via the bolt 243 mating with the nut 244. A maximum width of the stop plate 241 is greater than an outer diameter of the guiding tube 231, so as to limit the maximum lifting height of the air bag 21.

Figure 5:
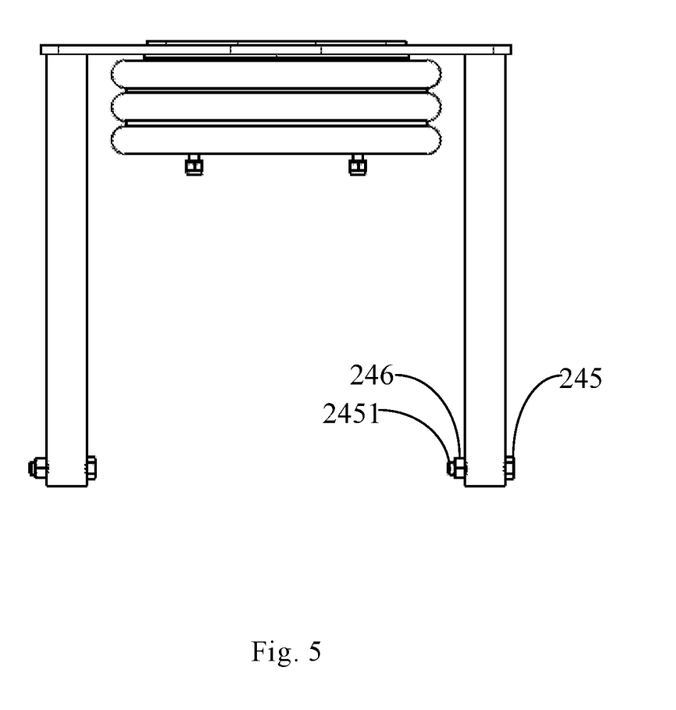
FIG. 5 is an enlarged schematic diagram of a stopper of an assistant unloading device according to another embodiment of the disclosure.

It would be noted, as long as the maximum lifting height of the air bag 21 can be limited, the stopper 24 may have some other structures but not limited to the embodiments described above. In another embodiment, as shown in FIG. 5, the stopper 24 comprises a bolt 245 and a nut 246. The bolt 245 has a threaded rod 2451 laterally penetrating a bottom portion of the guiding rod 232, and a penetrating end of the threaded rod mates with the nut 246. A length of the bolt 245 is greater than an outer diameter of the guiding tube 231, so as to limit the maximum lifting height of the air bag 21 by connecting the top end of the bolt 245 and the nut 246 with the guiding tube 231.

The frame body 1 comprises two frame longitudinal beams 11 longitudinally disposed and a front bolster 12 laterally disposed at front ends of the frame longitudinal beams 11. The front bolster 12 has a top surface depressed downwardly to form an air bag mounting base 1211, so as to place the air bag 21 of the assistant unloading device 2.

The frame longitudinal beam 11 comprises a longitudinal beam top flange 111, a longitudinal beam bottom flange 112, and a longitudinal beam web 113 vertically connected between the longitudinal beam top flange 111 and the longitudinal beam bottom flange 112.

The front bolster 12 comprises a front bolster web 122 vertically disposed, a front bolster top flange 121 fixed on a top surface of the front bolster web 122, and a bottom plate 123 fixed on a bottom surface of the front bolster web 122. Both ends of the bottom plate 123 are connected to the longitudinal beam bottom flange 112 of the frame longitudinal beam 11.

A bottom surface of the front bolster top flange 121 is connected to longitudinal beam top flange 111. An intermediate portion of the front bolster top flange 121 is depressed downwardly to form the air bag mounting base 1211, and the depressed intermediate portion is positioned between the two frame longitudinal beams 11. Portions of the front bolster top flange 121 outside of the two frame longitudinal beams 11 are bent to form a U-steel structure. Both ends of the front bolster top flange 121 are respectively provided with a corner lock 124 for locking the tank container 4 to the frame body 1.

The guiding tube 231 of the assistant unloading device 2 is fixed on a bottom surface of the front bolster top flange 121. A through hole, by which the guiding rod 232 is inserted into the guiding tube 231, is disposed at a portion of the front bolster top flange 121 corresponding to the guiding tube 231. A reinforcing plate 1212 is disposed on a periphery of the top surface of the front bolster top flange 121 corresponding to the through hole, so as to enforce the front bolster top flange 121.

The front bolster web 122 is vertically connected to the longitudinal beam web 113, and comprises an intermediate web 1221 and two lateral webs 1222. The intermediate web 1221 is positioned between the two frame longitudinal beams 11, and vertically connected to the two frame longitudinal beams 11. The two lateral webs 1222 are respectively connected to outer sides of the two frame longitudinal beams 11.

A partition panel 1221c is disposed on the intermediate web 1221. The partition panel 1221c divides the intermediate web 1221 into an upper intermediate web 1221a and a lower intermediate web 1221b beneath the upper intermediate web 1221a. At least one stiffener 1221d is vertically disposed between the partition panel 1221c and the front bolster top flange 121 to support the air bag 21 on the front bolster top flange 121. At least one weight-reducing hole 1221e is disposed in the intermediate web 1221. Preferably, the weight-reducing hole 1221e are provided in two, and each is centrally disposed in lower intermediate web 1221b.

Lower sides of the lateral webs 1222 are inclined in respect to the front bolster top flange 121, such that the lateral webs 1222 of the front bolster 12 form a structure wide in top and narrow in bottom. A lower side of the lateral web 1222 is connected to a side supporting plate 1223. The side supporting plate 1223 has a bottom end connected to the longitudinal beam bottom flange 112 of the frame longitudinal beam 11, and a top end connected to a reinforcing plate 1224. The reinforcing plate 1224 is further vertically connected to the lateral web 1222 of the front bolster 12, so as to enforce the front bolster top flange 121. At least one weight-reducing hole 1222a is disposed in the lateral web 1222. Preferably, the weight-reducing hole 1222a is provide one and is disposed in an intermediate portion of the lateral web 1222.

Figure 6:
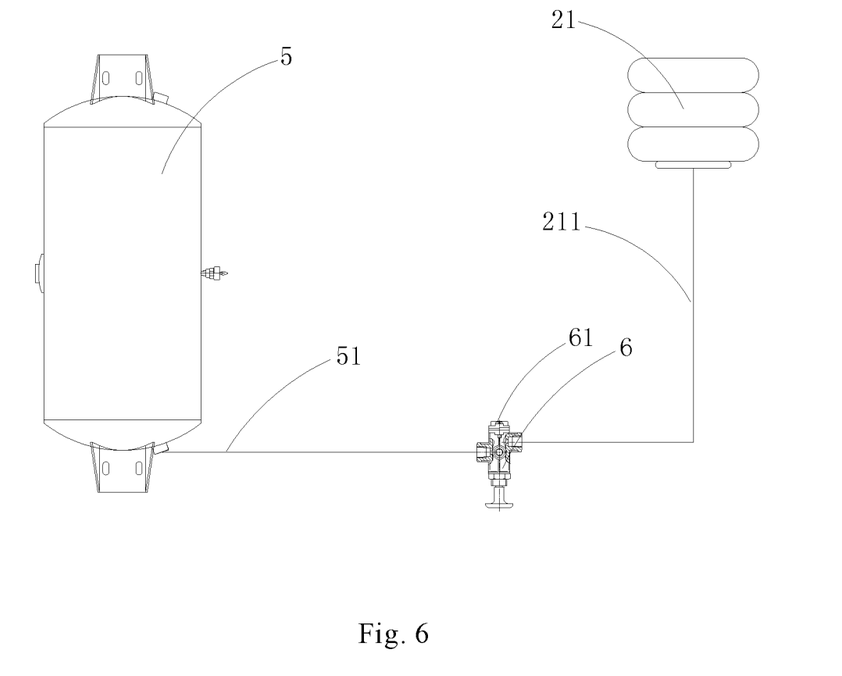
FIG. 6 is a schematic diagram showing connection of an air bag and an air reservoir of an assistant unloading device of the disclosure.

Referring to FIGS. 1 and 6, an air reservoir 5 and a manual control valve 6 would be used in unloading. The manual control valve 6 may be a two position three-way valve with a left position communicated with an end of an air tube 51 and a right position communicated with an end of the air tube 211. Moreover, another end of the air tube 211 is communicated with a bottom portion of the air bag 21 of the assistant unloading device 2, and another end of the air tube 51 is communicated with the air reservoir 5. The air reservoir 5 may be separately disposed. In this the embodiment, the air reservoir 5 is a brake system of the trailer 100 for storing excess air.

In the lifting process of the tank container 4, the manual control valve 6 is pressed down, so that a conduit between the air reservoir 5 and the air bag 21 is communicated. At the start of inflating, since an air pressure in the air reservoir 5 is higher than an air pressure of the air bag 21, the air reservoir 5 inflates the air bag 21 by the air tube 51, 211, and the air bag 21 gradually expands under the air pressure, such that the mounting plate 22 on the top portion of the air bag 21 pushes the tank container 4 slowly rising in the vertical direction. When the tank container 4 is lifted to a determined height, a lifting force of air bag 21 under the air pressure and a gravity force of the tank container 4 reach a balance, the lifting process is completed. After unloading is completed, if the tank container 4 is required to be lowered, the manual control valve 6 is pulled out, so that the conduit between the air reservoir 5 and the air bag 21 is shut off, and the air bag 21 is communicated with an exhaust port 61 of the manual control valve 6, thus the high pressure air in the air bag 21 begins to release. As the air pressure in the air bag 21 is gradually reduced, the air bag 21 gradually shrinks, the lifting force of the air bag 21 is also gradually reduced, and the tank container 4 may slowly lower back onto the frame body 1 in a vertical direction under the gravity force, the lowering process is completed.

Taking a tank container of 20 feet as an example. After experiment, when the load in the tank container 4 is equal to 30% of a full-laden load, if the air pressure in the air bag 21 may reach 0.6 MPa, lifting of the tank container 4 can be performed. If the air pressure rises to 0.8 MPa, then the lifting height of the tank container 4 can be 115 mm. As the load in the tank container 4 is reduced continuously, the lifting height would gradually rises to 300 mm. By means of the assistant unloading device 2, unloading process can be speeded up, and the load in the tank container 4 can be ensured completely unloaded.

In summary, the disclosure provides a trailer and frame thereof, wherein an intermediate portion of a front bolster is designed to be depressed to from an air bag mounting base, and the lifting air bag is mounted on the air bag mounting base, so a single air bag can perform lifting. The trailer and frame of the disclosure have not only a simple structure, a light mass, a lower cost, but also an excellent lifting capability and a stable lifting process. In addition, according to the disclosure, guiding of the air bag is performed via guides in the lifting process to prevent rollover of the air bag; the maximum lifting height of the air bag is limited by the stopper to avoid safety risk of the tank container caused by an over-high lifting height; by the first, second reinforcing plates and the stiffener, the strength of the frame body is increased; by the manual control valve, the air reservoir can perform inflating and deflating of the air bag, so lifting of the tank container is achieved with a simple operation, and requirement for light weight is satisfied while the assistant unloading is achieved.

The foregoing description only discusses preferred embodiments, rather than limits the implementations of the disclosure. A person skilled in the art, based on the main concepts of the disclosure, may easily make corresponding variations or modifications. Therefore, the protection scope of the disclosure should be limited solely by the appended claims.

What is claimed is:

1. A frame comprising a frame body, wherein the frame further comprises an assistant unloading device disposed on the frame body,
    the assistant unloading device comprises an air bag, a mounting plate, and at least a set of guides;
    the air bag is fixed to the mounting plate,
    the guides each comprising a guiding tube and a guiding rod,
    each guiding tube is vertically disposed on the frame body,
    each guiding rod is inserted into a respective one of the guiding tubes and connected to the mounting plate, and
    by inflating the air bag, each guiding rod is moved to vertically rise along the respective guiding tubes to perform assistant unloading,
    wherein the frame body comprises two frame longitudinal beams longitudinally disposed and a front bolster laterally disposed at front ends of the frame longitudinal beams, and
    the front bolster has a top surface depressed downwardly to form an air bag mounting base for placing the air bag.

2. The frame according to claim 1, wherein the assistant unloading device further comprises at least one stopper,
    one said stopper is mounted at a bottom portion of each guiding rod, and
    a maximum width of the stopper is greater than an outer diameter of the respective guiding tube, so as to limit a maximum lifting height of the air bag.

3. The frame according to claim 2, wherein the stopper comprises a stop plate and a stop plate mounting base, the stop plate mounting base is fixed in the bottom portion of the guiding rod, and has a center connected to a nut, the stop plate is connected to the stop plate mounting base by a bolt mating with the nut.

4. The frame according to claim 2, wherein the stopper comprises a bolt and a nut, a threaded rod of the bolt laterally penetrating a bottom portion of the guiding rod, and
    a penetrating end of the threaded rod mating with the nut.

5. The frame according to claim 1, wherein the air bag has a bottom portion connected to the air bag mounting base via bolts, and a top portion connected to a bottom surface of the mounting plate via bolts.

6. The frame according to claim 1, wherein the front bolster comprises a front bolster web vertically disposed and a front bolster top flange fixed on a top surface of the front bolster web, and
    an intermediate portion of the front bolster top flange is depressed to form the air bag mounting base.

7. The frame according to claim 6, wherein each of the frame longitudinal beams comprises a longitudinal beam top flange, a longitudinal beam bottom flange, and a longitudinal beam web vertically connected between the longitudinal beam top and bottom flanges,
    the longitudinal beam top flange is connected to a bottom surface of the front bolster top flange,
    the longitudinal beam web is vertically connected to the front bolster web,
    the front bolster top flange is depressed at a position between the two frame longitudinal beams,
    portions of the front bolster top flange outside of the two frame longitudinal beams are bent to form U-steel structures.

8. The frame according to claim 6, wherein the guiding tube is fixed on a bottom surface of the front bolster top flange,
    a through hole, through which the guiding rod is inserted into the guiding tube, is disposed at a portion of the front bolster top flange corresponding to the guiding tube,
    a first reinforcing plate is disposed at a periphery position on a top surface of the front bolster top flange corresponding to the through hole.

9. The frame according to claim 1, wherein the air bag is a single air bag.

10. The frame according to claim 2, wherein the air bag is a single air bag.

11. The frame according to claim 3, wherein the air bag is a single air bag.

12. The frame according to claim 4, wherein the air bag is a single air bag.

13. The frame according to claim 5, wherein the air bag is a single air bag.

14. The frame according to claim 6, wherein the air bag is a single air bag.

15. The frame according to claim 7, wherein the air bag is a single air bag.

16. The frame according to claim 8, wherein the air bag is a single air bag.

17. A trailer, wherein the trailer comprises the frame according to claim 1.

* * * * *